Oct. 9, 1956   E. M. LARGEN   2,765,720
HOEING ATTACHMENT FOR TRACTORS
Filed April 6, 1954   5 Sheets-Sheet 2
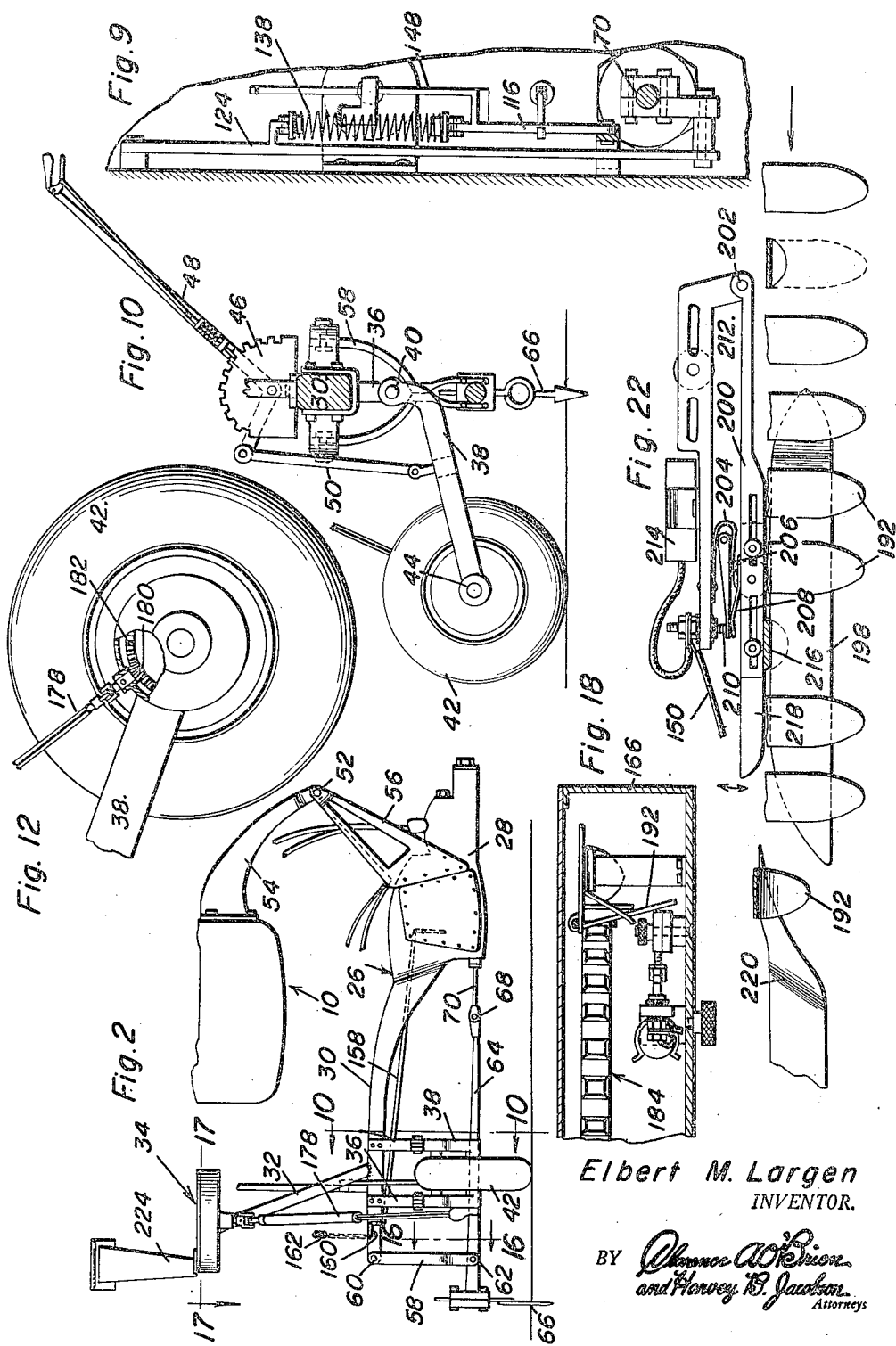
Elbert M. Largen
INVENTOR.

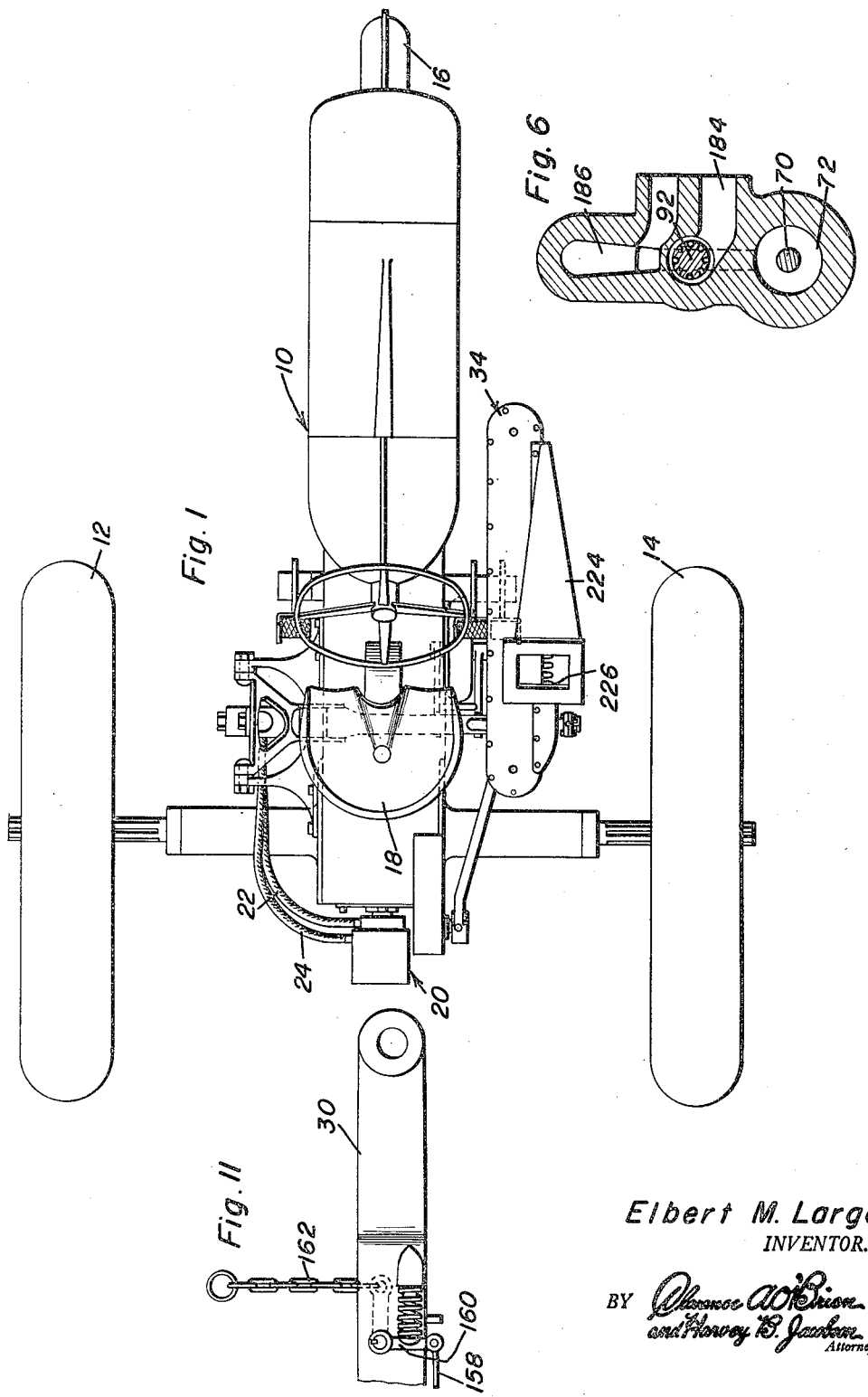

Oct. 9, 1956 E. M. LARGEN 2,765,720
HOEING ATTACHMENT FOR TRACTORS
Filed April 6, 1954 5 Sheets-Sheet 3
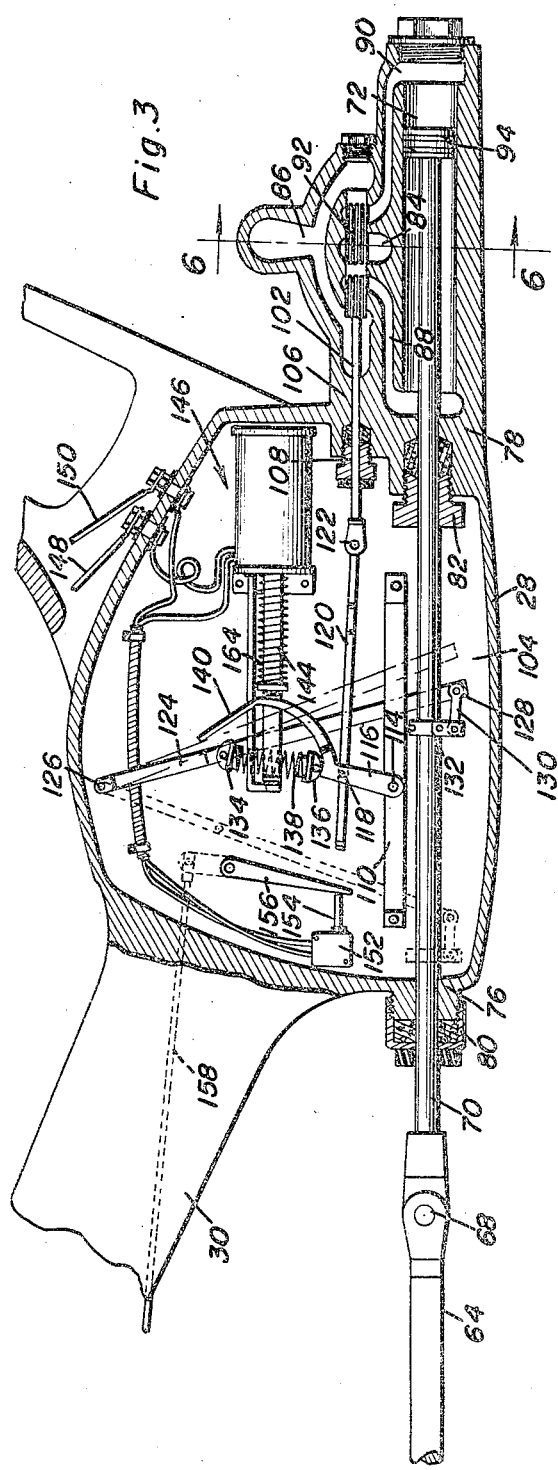
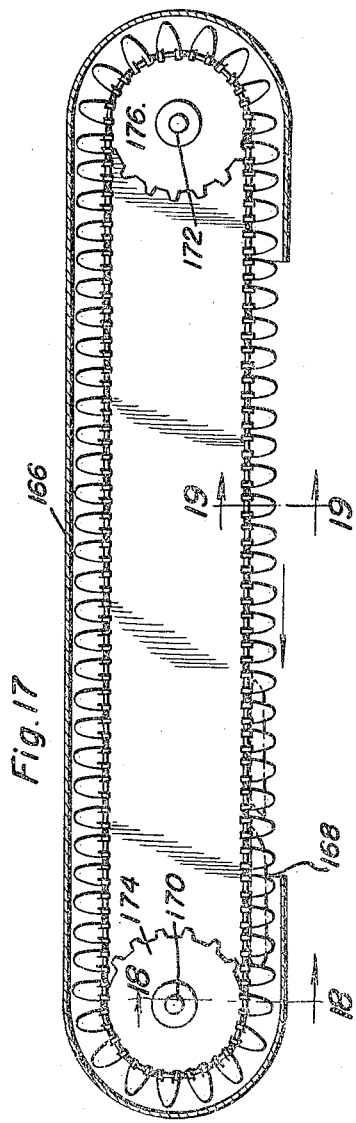
Elbert M. Largen
INVENTOR.

Oct. 9, 1956 E. M. LARGEN 2,765,720
HOEING ATTACHMENT FOR TRACTORS
Filed April 6, 1954 5 Sheets-Sheet 4
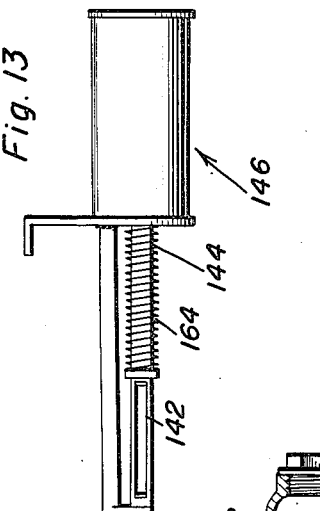
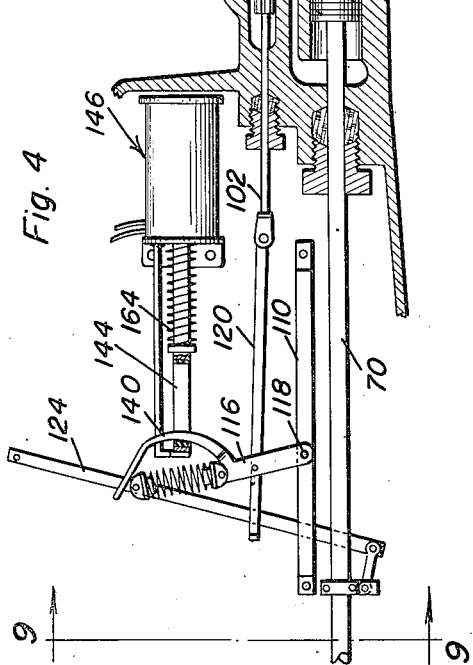
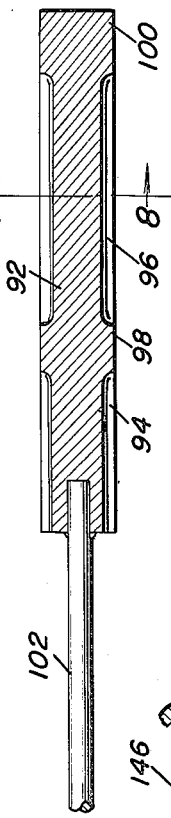
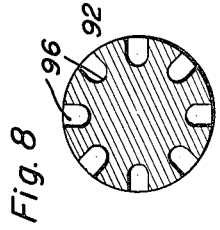
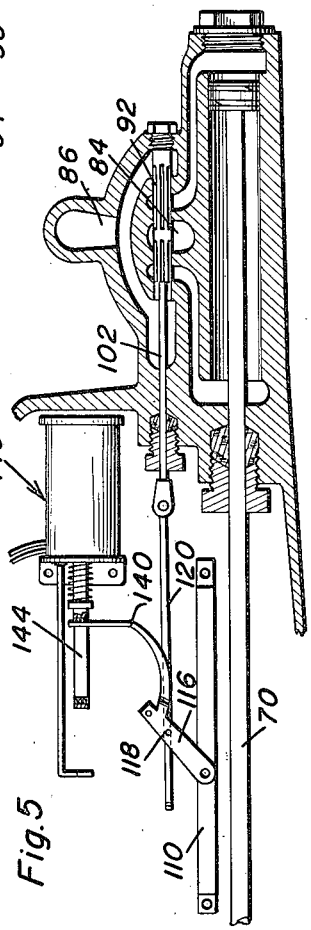
Elbert M. Largen
INVENTOR.

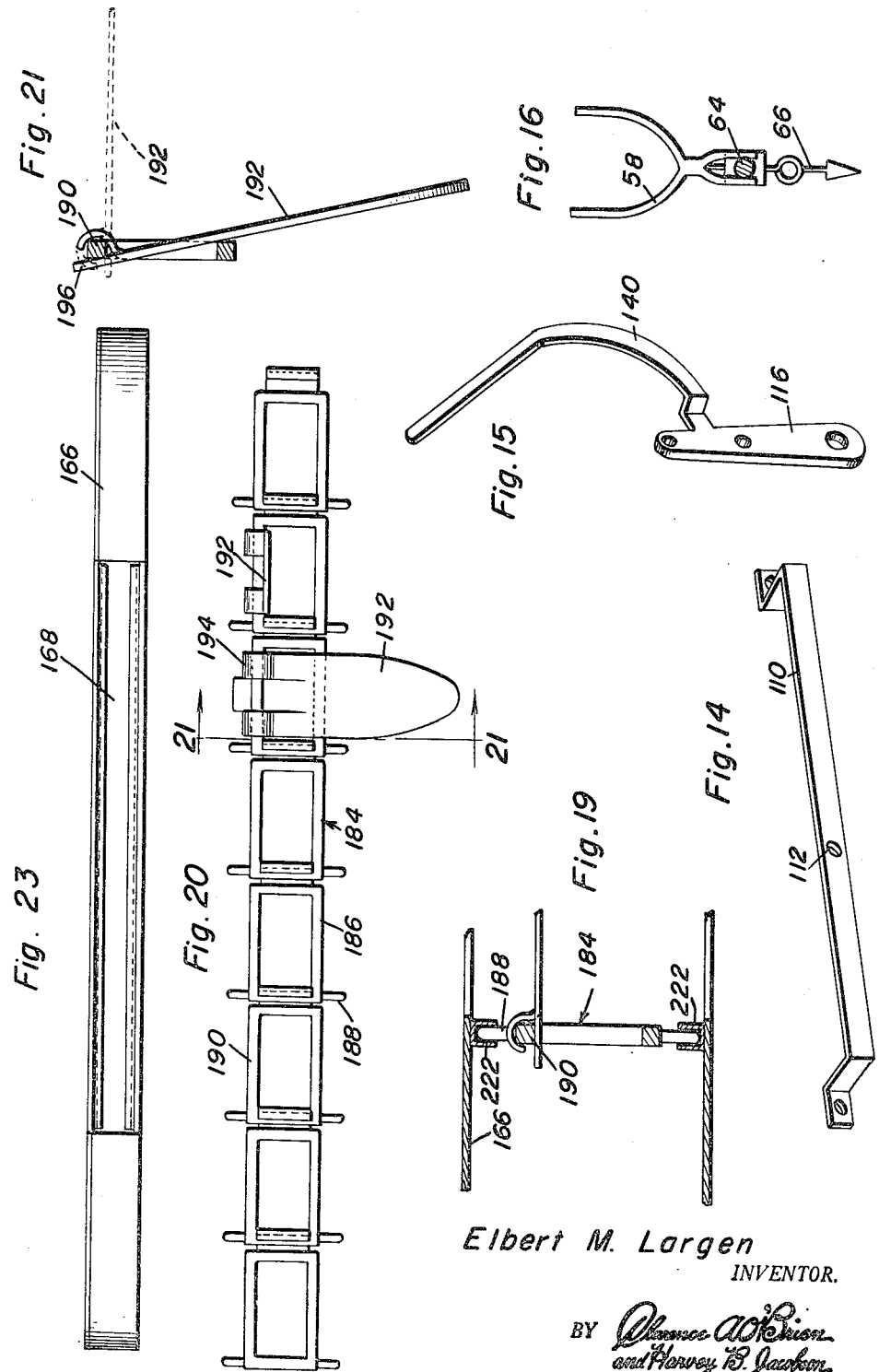

United States Patent Office 2,765,720
Patented Oct. 9, 1956

2,765,720

HOEING ATTACHMENT FOR TRACTORS

Elbert M. Largen, Laurel Fork, Va.

Application April 6, 1954, Serial No. 421,236

4 Claims. (Cl. 97—45)

This invention relates to a hoeing attachment for tractors and pertains more particularly to a device for hoeing between the successive plants in a row along which the tractor is moving.

In the attachment which forms this invention, provision is made for effecting a hoeing action transverse to the path of movement of the tractor to which it is attached, means being provided for periodically arresting the hoeing action in preselected timed relation to the movement of the tractor for preventing damage to the individual plants in the row of plants being operated upon.

This attachment encompasses means under the control of and preselected by the operator of the tractor for arresting the hoeing action enabling the operator to perform a series of preselected controlling actions which will arrest the hoeing action at the proper time and in proper timed relation with respect to the speed of the tractor and the distance between individual plants in a row in order to avoid damage to the individual plants during the hoeing operation.

These, together with other objects and advantages which become subsequently apparent reside in the details of construction and operation as more fully hereinafter described and claimed, reference being had to the accompanying drawings forming a part hereof, wherein like numerals refer to like parts throughout, and in which:

Figure 1 is a plan view of a tractor provided with the novel attachment;

Figure 2 is a rear elevational view of the attachment;

Figure 3 is an enlarged sectional view showing a portion of the power unit;

Figure 4 is a view showing a portion of the assembly shown in Figure 3 with parts in different position;

Figure 5 is a view similar to Figure 4 but showing the valve mechanism in piston arresting position;

Figure 6 is a transverse vertical section taken substantially along the plane of section line 6—6 of Figure 3;

Figure 7 is a longitudinal section taken through the valve member;

Figure 8 is a transverse section taken substantially along the plane of section line 8—8 in Figure 7;

Figure 9 is a sectional view looking in the direction of the arrows 9—9 in Figure 4;

Figure 10 is an enlarged vertical section taken substantially along the plane of section line 10—10 in Figure 2;

Figure 11 is an elevational view showing the mechanism for holding the attachment in elevated inoperative position;

Figure 12 is an elevational view partly in section showing the combined supporting and driving wheel of the attachment;

Figure 13 is an elevational view of solenoid mechanism;

Figure 14 is a perspective view of the valve actuating lever bracket;

Figure 15 is a perspective view of the valve actuating lever;

Figure 16 is a sectional view taken substantially along the plane of section line 16—16 in Figure 2;

Figure 17 is a horizontal section taken substantially along the plane of section line 17—17 in Figure 2;

Figure 18 is a sectional view taken substantially along the plane of section line 18—18 in Figure 17;

Figure 19 is a sectional view taken substantially along the plane of section line 19—19 in Figure 17;

Figure 20 is an elevational view of a portion of the keyboard mechanism;

Figure 21 is a vertical section taken substantially along the plane of section line 21—21 in Figure 20;

Figure 22 is a plan view partially in section showing the switch mechanism of the keyboard assembly; and Figure 23 is a side elevational view of the keyboard assembly.

Referring now more particularly to Figure 1, reference numeral 10 indicates the structure of a conventional tractor assembly generally which is provided with rear wheels 12 and 14 and a steerable front wheel member 16 as well as a seat 18 upon which the operator of the vehicle is stationed. Other than the attachment itself, the tractor is provided with a hydraulic pump and reservoir assembly 20 driven from the power takeoff unit thereof from which a pressure line 22 and a return line 24 extend for connection to the hoeing attachment in a manner presently set forth.

As seen most clearly in Figure 2, the attachment itself consists of an elongated body assembly 26 consisting essentially of a power unit portion 28 and a supporting arm portion 30, the latter of which supports by means of a stay-rod 32 the keyboard assembly indicated generally by the reference character 34.

As seen in Figure 10, the arm 30 is provided with a bracket 36 to which one end of a wheel yoke member 38 is pivotally attached as at 40, the opposite end of the yoke journaling the wheel 42 on the axle 44. A sector 46 is rigidly secured to the arm 30 and an operating lever 48 is associated therewith for changing the angular relationship existing between the arm 30 and the yoke 38 through the link member 50 to raise and lower the arm with respect to the ground.

The power unit end of the attachment is pivotally secured as at 52 to a depending arm 54 on the tractor body 10 by means of a bracket 56 in the manner shown most clearly in Figure 2.

A yoke member 58 as shown in Figures 2, 10 and 16 is pivotally secured at its upper end as at 60 to the outer extremity of the arm 30 and its lower end is pivotally secured as at 62 to a reciprocating hoe rod 64 which carries a suitable hoeing shovel 66 in depending relation thereto at its outer extremity.

The other end of this hoeing arm is pivotally secured as at 68 to the free end of a piston rod 70 which extends outwardly from the power unit 28, reference being had more particularly in this respect to Figure 3. The power unit includes a cylinder 72 within which a piston 74 is reciprocably received and to which the piston rod 70 is rigidly attached. The piston rod is guided in its movement into guide pushing portions 76 and 78 of the housing forming the power unit, suitable packing glands 80 and 82 being associated therewith. The previously mentioned pressure line 22 from the hydraulic pump is connected to an inlet pressure chamber 84 and the return line 24 is connected to an exhaust chamber 86. The opposite ends of the cylinder 72 are provided with passages 88 and 90 and a valve member 92 interconnects the various passages for operation of the piston 74 within the cylinder 72. The valve at 92 has fluted passages 94 and 96 in the manner shown most clearly in Figure 7 and an intermediate solid portion 98 as well as an end solid portion 100. The valve stem 102 is connected to the valve and extends outwardly into the chamber 104 through a guide pushing portion 106 of the power unit, a packing gland 108 being provided to prevent leakage of hydraulic fluid.

A generally U-shaped bracket 110 is secured within the chamber 104 and is provided with an aperture 112 to receive a pivot pin 114 to which one end of a valve actuating lever 116 is secured. An intermediate portion of the actuating lever is pinned as at 118 to a link member 120 pivotally connected as at 122 to the free end of the valve stem 102. A lever 124 pivoted to the casing as at 126 is pivotally connected at its other end as at 128 to a short link member 130 connected by suitable clamp brackets 132 to the piston rod 70 so that the lower free end of the lever 124 swings back and forth as the piston rod reciprocates. A snap spring connection is established between the lever 124 and the lever 116 by means of a pair of pivot brackets 134 and 136 between which a tension spring 138 is secured. The finger portion 140 of the lever 116 extends through a slot 142 (see Figure 13) in the core 144 of a solenoid assembly 146 such that the end positions of travel of the arm 116 are fixed. These positions are as shown in Figures 3 and 4, respectively, for alternately connecting the opposite ends of the cylinder 72 to the inlet and outlet chambers 84 and 86, respectively.

The solenoid, when energized, will pull the finger 140 to the position shown to force the valve 92 in the position shown in Figure 5 wherein neither end of the cylinder is under direct action of the hydraulic fluid under pressure so that the piston will remain in the position it has reached at the time that the solenoid 146 was energized. The solenoid is energized through the means of a pair of lead wires 148 and 150 in a manner presently set forth.

A normally closed switch 152 is provided in the casing and has an operating plunger 154 in the path of movement of a bell crank member 156 connected at its opposite end to a control rod 158 extending therefrom to a further bell crank 160 as shown in Figure 2. The other end of the bell crank 160 is connected to a chain member 162 by means of which the attachment may be pivoted about its connection 52 to an elevated inoperative position. This elevation effects opening of the switch 152 and consequent inability of the solenoid 146 to be energized inasmuch as this switch is in circuit between the lead 150 and the solenoid.

Normally, of course, a spring member 164 urges the solenoid core 144 to the outermost position.

The previously mentioned keyboard assembly 34 incorporates a casing 166 having an opening 168 in one side thereof (see particularly Figures 17 and 23) and this casing journals a pair of spaced sprocket shafts 170 and 172 upon which the sprockets 174 and 176, respectively, are secured and one of the sprocket shafts is driven by means of an extensible drive shaft 178 having a bevel gear 180 on one end thereof meshing with a ring gear 182 on the supporting wheel 42 in the manner shown most clearly in Figure 12.

Entrained about these sprockets is a chain member 184 formed of a series of open rectangular link members 186 pivotally interconnected by the hinge pin member 188 (see particularly Figure 20).

On the upper bar 190 of each link a blade member 192 is pivotally secured, it being noted that each blade member has a pair of arcuate offset tongue members 194 engaging on one side of the bar 190 and a straight portion 196 on the opposite side of the bar 190. It will be further noted that the bar 190 is of rectangular cross section so that the blades are normally held in the dotted line position shown in Figure 21 but may be manually depressed to the full line position shown in that figure.

A cam member 198 is secured to the casing adjacent the chain 184 and a switch arm 200 pivotally secured to a pivot pin 202 on the casing normally engages against this cam and is normally held in engagement therewith under the action of a suitable brake member 204 in the manner shown most clearly in Figure 22. The spring 204 acts through a movable contact member 206 engaging against a resilient actuating finger 208 secured to the arm 200 and a stationary contact 210 is fixed to bracket 212 in the manner shown. A condenser 214 is provided to prevent arching between the points 210 and 206. From Figure 22 it will be readily apparent that a depressed blade member indicated by the reference character 216 in that figure will move the arm 200 away from engagement with the cam 198 and effect closing between the contact 206 and 210 to complete the circuit to the solenoid 146 for a purpose presently apparent. The time of duration that the solenoid is energized is adjustable by means of an extension member 218 on the arm 200 which is extensible in connection therewith. To return the blades 192 to their normal horizontal position, a suitable cam member 220 is provided against which the depressed blades engage for rotation about the chain bars 190 to their normal horizontal position.

The bracket 212 is shiftable longitudinally back and forth to adjust the point at which the arm 200 will be swung away from the cam 198.

As seen most clearly in Figure 19, the hinge pins 188 of the chain 184 are received in guide tracks 222 to prevent twisting of the chain 284 either as the blades 192 are manually depressed or as they are automatically returned to the normal horizontal position.

As seen most clearly in Figure 1, a shroud assembly 224 is disposed in overlying relation to the open portion of the keyboard and a side opening 226 is provided therein. The operator sitting on the station or seat 18 may thereby have visual access to the blade members 192.

In operation, as the tractor is being driven along a row of plants between which the attachment is desired to cultivate, he merely sights through the opening 226 and when a plant comes within his view he depresses a blade 192 which is between his line of sight and the plant. Since the chain 184 is driven in the same speed or at least in a speed corresponding to the speed of the attachment to the wheel 42, it will be apparent that the cam 198 and associated switch arms 200 are positioned linearly away from the blade 192 thus depressed to correspond to the movement between the hoe shovel and the plant under consideration such that when the attachment reaches the plant the depressed blade will effect energization of the solenoid 146 and consequent arrested or stopping of the hoeing motion to prevent damage to the plant. Of course, to accurately effect this result the operator's head must be positioned somewhere near a standard reference point longitudinally of the tractor and for this reason it may be desirable to provide the casing 126 with a suitable reference marking with which the operator may effect proper positioning of his head so that the hoeing operation will be arrested at the proper time. Of course, as previously pointed out, a slight timing variation may be accomplished by longitudinal adjustability of the bracket 212 and the length of duration of the arresting action of the hoeing is accomplished by accessibility of the portion 218 of the switch arm 200.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A hoeing attachment for tractors comprising an elongated body pivotally attached at one end to a tractor and extending transversely to the longitudinal axis thereof, a wheel supporting the other end of said body in spaced relation to the ground, a hoeing shovel carried by said body, means for reciprocating said shovel, electro-magnetic means for momentarily arresting the motion of said shovel, and manually controlled means for rendering said electro-magnetic means effective including an endless movable chain, depressible members on said chain, and cam means for moving said depressible members laterally when depressed.

2. In combination with a tractor, a hoeing attachment comprising a power unit attached to said tractor, said attachment including a hoeing shovel reciprocably driven by said power unit and movable in a path transverse to the longitudinal axis of the tractor for hoeing between successive plants in a row along which the tractor is moving, electro-magnetic means for momentarily arresting the motion of said shovel, and manually controlled means for rendering the electro-magnetic means effective including an endless movable chain, depressible members on said chain, cam means for moving said members laterally when depressed, and a switch engaged by and closed by the laterally moved members.

3. A hoeing attachment for tractors comprising an elongated body pivotally attached at one end to a tractor and extending transversely to the longitudinal axis thereof, a wheel supporting the other end of said body in spaced relation to the ground, a hoeing shovel carried by said body, means for reciprocating said shovel, means for momentarily arresting the motion of said shovel, and manually controlled means for rendering the second named means effective including an endless movable chain having a series of depressible blade members thereon, and cam means engaged by the depressible blade members and moving the blade members laterally.

4. The combination of claim 2, and means for varying the duration of lateral movement of said members.

References Cited in the file of this patent
UNITED STATES PATENTS

| | | |
|---|---|---|
| 988,450 | Firebaugh | Apr. 4, 1911 |
| 2,421,194 | Given | May 27, 1947 |
| 2,664,802 | Myer | Jan. 5, 1954 |
| 2,667,024 | Hauswirth | Jan. 26, 1954 |